United States Patent
Morii

(10) Patent No.: US 7,020,534 B2
(45) Date of Patent: Mar. 28, 2006

(54) RECYCLING METHOD

(75) Inventor: Yoshihiro Morii, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 96 days.

(21) Appl. No.: 10/855,502

(22) Filed: May 28, 2004

(65) Prior Publication Data

US 2005/0015181 A1  Jan. 20, 2005

(30) Foreign Application Priority Data

Jun. 6, 2003 (JP) .............................. 2003-162708

(51) Int. Cl.
*G06F 19/00* (2006.01)
(52) U.S. Cl. .................... 700/106; 700/99; 700/103
(58) Field of Classification Search ................ 700/95, 700/97, 106, 213, 296
See application file for complete search history.

(56) References Cited

U.S. PATENT DOCUMENTS

| | | | |
|---|---|---|---|
| 5,253,994 A * | 10/1993 | Zweig et al. ............... 425/130 |
| 6,000,784 A | 12/1999 | Takemoto et al. ............ 347/50 |
| 6,217,684 B1 | 4/2001 | Morii et al. .................. 156/64 |
| 6,224,709 B1 | 5/2001 | Takemoto et al. ........ 156/275.5 |
| 6,435,241 B1 | 8/2002 | Morii et al. ................. 156/351 |
| 6,471,801 B1 | 10/2002 | Takemoto et al. ............ 156/60 |
| 6,472,247 B1 | 10/2002 | Andoh et al. .................. 438/4 |
| 6,503,358 B1 | 1/2003 | Takemoto et al. ........... 156/295 |
| 6,544,376 B1 | 4/2003 | Takemoto et al. ........ 156/273.3 |
| 6,574,054 B1 | 6/2003 | Hirai et al. ................. 359/819 |
| 6,575,221 B1 | 6/2003 | Morii et al. ................ 156/578 |
| 6,627,015 B1 | 9/2003 | Takemoto et al. ............ 156/64 |
| 6,679,442 B1 | 1/2004 | Morii et al. ............... 241/24.1 |
| 6,693,751 B1 | 2/2004 | Morii et al. ................. 359/819 |
| 6,726,806 B1 | 4/2004 | Takemoto et al. ........ 156/379.6 |
| 6,856,857 B1 * | 2/2005 | Tateishi et al. ............. 700/213 |
| 2002/0148090 A1 * | 10/2002 | Kaburagi et al. .......... 29/403.1 |
| 2003/0199596 A1 * | 10/2003 | Koike et al. .................. 521/40 |

* cited by examiner

*Primary Examiner*—Leo Picard
*Assistant Examiner*—Chad Rapp
(74) *Attorney, Agent, or Firm*—Oblon, Spivak, McClelland, Maier & Neustadt, P.C.

(57) ABSTRACT

A recycling method enables closed-loop material recycling (CMR) to be smoothly performed while reducing the amount of a recovered material disposed of outside the CMR loop. The amount of use of recovered ABS in a copying machine in a product production division is determined on the basis of a plan to produce the copying machine in the product production division and the amount of production of recovered ABS in a recovered material production division for producing recovered ABS from used component parts. The amount of use may be determined by adjusting the mixing ratio of recovered ABS and virgin ABS in a regenerated material production division for producing regenerated ABS by mixing recovered ABS and virgin ABS.

20 Claims, 9 Drawing Sheets

RECYCLING METHOD

BACKGROUND OF THE INVENTION

1. Field of the Invention

The present invention relates to a recycling method for recycling a material in used component parts returned from consumers. The present invention also relates to a product producing method, a part ordering method, a mixing ratio determination method, an information processing apparatus and a program useful in recycling.

2. Description of the Background Art

In recent years, consumers and investors have come to consider, in selecting a company, to which extent the company contributes to environmental protection. For this reason, it is urgently necessary for manufacturers to establish a recycling system in which resources can be effectively used and wastes and energy consumption can be effectively reduced and to make the recycling system operational.

In the past, products and parts of the products used to the ends of their lives under users were ordinarily disposed of by waste treaters in a landfill manner or otherwise. In recent years, however, processes for recycling products and parts in various modes after the ends of their lives have been positively pursued in consideration of environments.

As modes of such recycling, "private reuse", "product reuse", "part reuse", "closed-loop material recycling (hereinafter referred to as CMR)", "reduction to raw material", "energy recovery" and so on are known. In recent years, importance has been attached particularly to the "CMR" mode in these modes of recycling. With "CMR", however, there is a problem that the instability of the amount of recovered used parts hinders "CMR" from being smoothly performed.

In "CMR", closed-loop material recycling of plastic materials in particular is called "PCMR". As a recycling system for implementation of such recycling, a system disclosed in Japanese Patent Laid-Open No. 2000-181958 for example is known.

SUMMARY OF THE INVENTION

In view of the above-described circumstances, an object of the present invention is to provide a recycling method which enables "CMR" to be smoothly performed while reducing the amounts of recovered materials processed outside a "CMR" loop.

Another object of the present invention is to provide a product producing method, a part ordering method, a mixing ratio determination method, an information processing apparatus and a program useful in recycling.

In accordance with the present invention, there is provided a recycling method in which a recovered material is reused for a new product. The method comprises a product producing step of producing a product by assembling component parts, a recovery step of recovering a used component part as the recovered material from consumers, a recovered material producing step of producing the recovered material from the used component part, a regenerated material producing step of producing a regenerated material by mixing the recovered material with a virgin material not containing the recovered material and a part producing step of producing a component part using the regenerated material. The amount of use of the recovered material in the product in said product producing step is determined on the basis of a plan to produce the product and the amount of recovery of the used component part in said recovery step.

In accordance with the present invention, there is also provided a product producing method in which a regenerated-material-using component part using a regenerated material obtained by mixing a recovered material produced from a used component part recovered from consumers and a virgin material not containing the recovered material is assembled on the basis of a production plan to produce a product. The method comprises determining the amount of use of the recovered material in the product on the basis of at least one of the amount of recovery of the used component part from the consumers, the amount of production of the recovered material and the amount of production of the regenerated material, and on the basis of the production plan.

In accordance with the present invention, there is also provided a part ordering method of ordering a regenerated-material-using component part using a regenerated material obtained by mixing a recovered material produced from a used component part recovered from consumers and a virgin material not containing the recovered material. The method comprises determining the order ratio of the regenerated-material-using component part and a virgin component part not including the regenerated material on the basis of at least one of the amount of recovery of the used component part from the consumers, the amount of production of the recovered material and the amount of production of the regenerated material, and on the basis of a plan to produce a product on which the regenerated-material-using component part is mounted.

In accordance with the present invention, there is also provided a mixing ratio determination method of determining the mixing ratio of a recovered material produced from a used component part recovered from consumers and a virgin material not containing the recovered material with respect to a regenerated material obtained by mixing the recovered material and the virgin material. The method comprises determining the mixing ratio on the basis of at least one of the amount of recovery of the used component part from the consumers and the amount of production of the recovered material and on the basis of a plan to produce a product on which a component part using the regenerated material is mounted.

In accordance with the present invention, there is also provided an information processing apparatus which comprises an information input device of accepting input of information, a computation device of performing predetermined computational processing on the basis of the input information and an information output device of outputting the results of computation performed by said computation device. The computation device is arranged to perform computational processing for computing the amount of use of a recovered material produced from a used component part recovered from consumers in a product on which a regenerated-material-using component part using a regenerated material obtained by mixing the recovered material and a virgin material not containing the recovered material. The computation device computes the amount of use on the basis of information on a plan to produce the product and information on the amount of recovery of the used component part from consumers.

In accordance with the present invention, there is also provided a machine-readable program used for an information processing apparatus which performs predetermined computational processing. The program enables a computer to function as use amount computation device of computing the amount of use of a recovered material obtained by disassembly of a used component part recovered from consumers in a product on which a regenerated-material-using component part using a regenerated material obtained by mixing the recovered material with a virgin material not containing the recovered material. The computation device computes the amount of use on the basis of at least one of information on the amount of recovery of the used component part, information on the amount of production of the recovered material and information on the amount of production of the regenerated material, and on the basis of information on a plan to produce the product.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED
EMBODIMENTS

Concrete description will be made of the above-mentioned modes of recycling with reference to the drawings before description of each of embodiments of the present invention.

Figure 1:
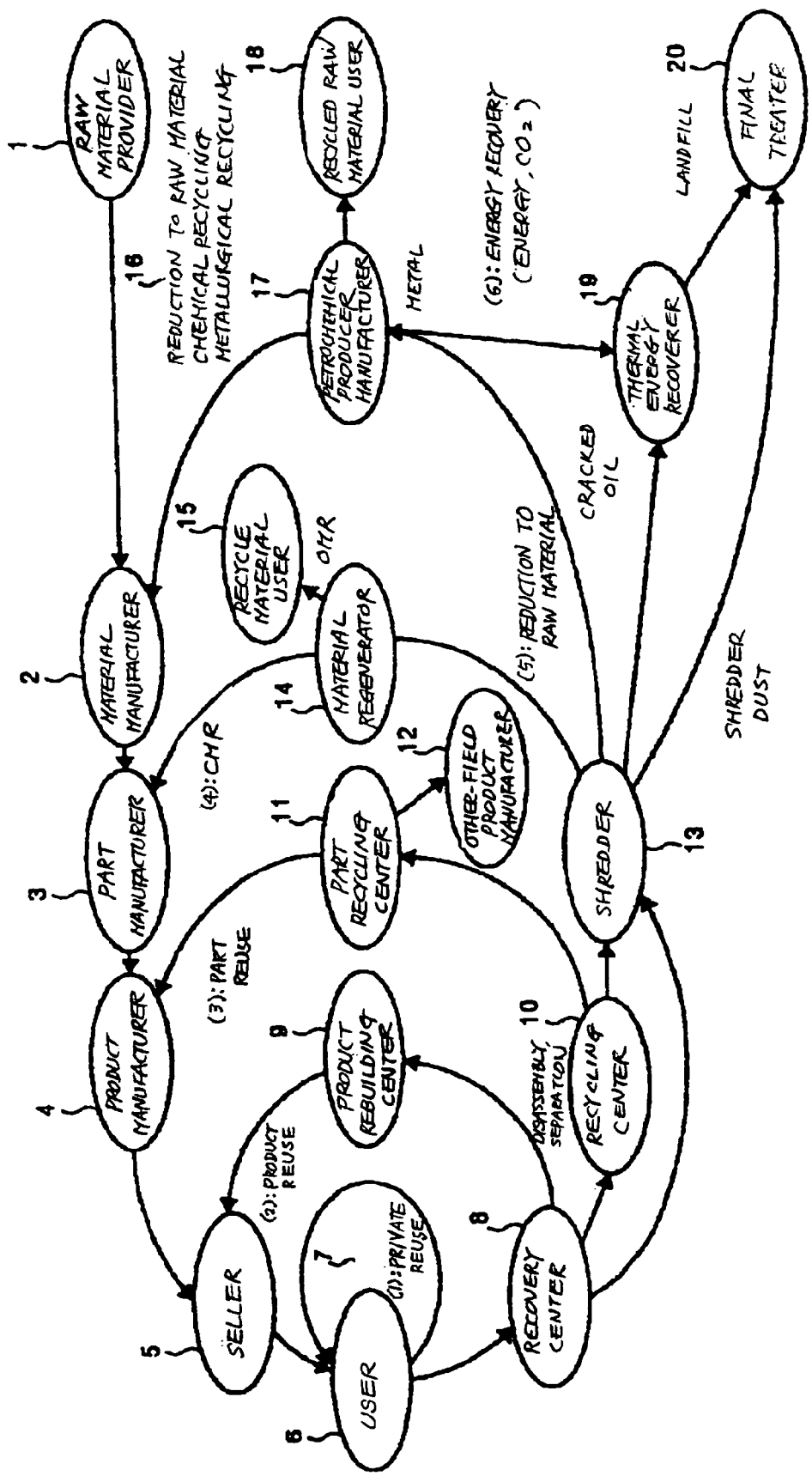
FIG. 1 is a material flow diagram showing a comet circle representing flows of resources on the market.

FIG. 1 shows material flows representing the flows of resources on the market and commonly called a comet cycle. Referring to FIG. 1, a raw material provider 1 supplies a material manufacturer 2 with a row material refined from a natural material. Under the material manufacturer 2, the supplied raw material is processed into a part material (e.g., a plastic material) for forming a component part. The component part finished by a part manufacturer 3 is thereafter used as a portion of a product produced by a product manufacturer 4. The produced product is supplied to users 6 through a seller 5 such as a selling agent. The flow of the raw material to users is a basic resource flow. Raw materials and part materials will be referred to simply as materials.

As already described above, products and parts of the products used to the ends of their lives under users were ordinarily disposed of by waste treaters in a landfill manner or otherwise. In recent years, however, processes for recycling products and parts in various modes after the ends of their lives have been positively pursued in consideration of environments. The simplest mode of recycling is the "private reuse" mode indicated at (1) in FIG. 1. In this mode of recycling, a product or a part which has become unusable by a user is reused by being processed in a certain manner by the user. For example, in the case of a copying machine product, a toner replenishing operation is performed on an emptied toner container by a user to recover the function of the toner container, thereby enabling reuse of the toner container. In this manner, the material of the toner container is recycled. There is no need to perform any machining on the product or the component part or to put it in a circulation path, and processing based on a user's manual operation can be performed. Therefore it can be said that this mode of recycling is of a smallest environmental load.

The "product reuse" mode indicated at (2) in FIG. 1 is next to the "private reuse" mode in increasing order of environmental load. In this mode, a product recovered from a user by a recovery facility such as a recovery center 8 is rebuilt by being overhauled or otherwise processed in a product rebuilding facility such as a product rebuilding center 9, and is returned to the seller 5 in the above-described basic flow. For example, in the case of a copying machine, a process cartridge manufactured as a product and constituted by a photosensitive material and a development device or the entire copying machine is rebuilt, thereby recycling materials. In this mode, a process for rebuilding in the product rebuilding facility is performed, replacement of parts is required, and circulations through the recovery facility, the rebuilding facility and the basic flow are included. Therefore the environmental load in this mode is larger than that in the "private use" mode. The difference between recycling of a product and recycling of a component part resides in that the product is sold in a single state to users while the component part is not sold in a single state to users.

The "part reuse" mode indicated at (3) in FIG. 1 is next to the "product reuse" mode in increasing order of environmental load. In this mode, a recovered product is disassembled and separated into component parts in a disassembly facility such as a recycling center 10 and some of the component parts are rebuilt in a part rebuilding facility such as a part rebuilding center 11. The rebuilt component parts are returned to an intermediate point in the basic flow by being delivered to the product manufacturer 4. The environmental load in the "part reuse" mode is larger than that in the "product reuse" mode since a larger number of processes or circulations are required in comparison with the "product reuse" mode.

The "closed-loop material cycling (hereinafter referred to as CMR)" mode indicated at (4) in FIG. 1 is the next mode in increasing order of environmental load. In this mode, a component part separated from a product is pulverized in a pulverization facility such as a shredder 13 to be obtained as a recovered material. The recovered material is mixed with a virgin material in a material regeneration facility such as a material regenerator 14 to produce a regenerated material. The regenerated material is supplied to the part manufacturer 3 to form a new part. Thus, a larger number of processes or circulations is included in comparison with the "part reuse" mode and the environmental load is correspondingly increased.

The "reduction to raw material" mode indicated at (5) in FIG. 1 is next to the "CMR" mode in increasing order of environmental load. In this mode, a recovered material obtained by pulverization of a component part is used not in its present composition but after being reduced to a raw material. Since a process for reduction to a raw material and the corresponding circulation are included, the environmental load is increased in comparison with the "CMR" mode.

The recycling mode having the largest environmental load is the "energy recovery" mode indicated at (6) in FIG. 1. In this mode, a burnable material such a plastic material is effectively used as a fuel. In this mode, recycling after such use cannot be performed and, therefore, the environmental load is maximized.

As described above, the "private reuse" mode is most preferable from the viewpoint of reducing the environmental load. However, it is impossible to perpetually perform recycling in this mode only. This is because a product or a component part is eventually broken or the end of its life is reached however high the durability of the product or the component part may be. When a product or a component part is broken or when the end of its life is reached, the product or the component part undergoes processing in the "product reuse" mode or the "part reuse" mode. However, there is also a limit to recycling in this mode because when a new product or component part appears, the old product or component part becomes obsolescent and its economical value on the market is lost.

On the other hand, recycling of resources in the "CMR" mode can be repeated for a substantially long time. That is, if a resource is returned to the part material level, it can be returned to the above-described basic flow by being taken in a new product or component part.

An "open-loop material recycling (hereinafter referred to OMR)" mode similar to the "CMR" mode exists. In this mode, a regenerated material produced in the material regeneration facility as illustrated is delivered not to the particular part manufacturer 3 but to an indefinite number of material users including a recycled material user 15. The "CMR" mode is more advantageous than the "OMR" mode in the following respect. That is, because a regenerated material flows to the particular part manufacturer 3 without flowing to an indefinite number of material users who may not necessarily return the material to the above-described basic flow, repeated circulatory use of the material can be ensured. The "CMR" mode is also advantageous in terms of controllability of the physical properties of a regenerated material.

More specifically, in the "CMR" mode", particular companies or manufacturers can easily exist as a plurality of facilities relating to circulations such that a "company A" produces a component part, a "company B" produces and recovers a product and a "company C" disassembles a product and obtains recovered materials. In such a case, a component part from which a recovered material is derived is definitely identified, for example, as a "recovered material derived from a component part a produced by company A". If the original material is identified, the physical properties of the recovered material can be easily identified. For example, a plastic material ordinarily contains various additives including a halogen-based or non-halogen flame retardant other than a plastic resin used as a basic material. Therefore, even plastic materials of the same kind (e.g., polyethylene) vary in physical properties. In a case where a plastic material the physical properties of which are unknown is used as a recovered material, it is difficult to control the physical properties of a regenerated material obtained by mixing the plastic material with a virgin material. In the "CMR" mode, however, the physical properties of a recovered material can be known and, therefore, the physical properties of a regenerated material can be easily controlled.

For the above-described reason, importance has been attached particularly to the "CMR" mode in recent years. As a recycling system capable of implementation of CMR, particularly plastic CMR (PCMR), the recycling system proposed by the applicant of the present invention and disclosed in Japanese Patent Laid-Open No. 2000-181958 is known.

With the "CMR" mode, however, there is a problem that the instability of the amount of recovered used parts hinders "CMR" from being smoothly performed, as mentioned above. More specifically, the time during which a product is used varies largely from user to user, because there are users each of who positively buys a new product as a substitute for an old one when the new product is put on the market, and other users each of who repairs and uses a product until the end of the life of the product is almost reached. Due to such variation in use time, the stability of the amount of products or parts from users is inevitably reduced. In such a situation, the stability of the productivity of a recovered material and a regenerated material (recovered material+virgin material) and, hence, the stability of the productivity of a component part manufactured by using the regenerated material is inevitably reduced.

On the other hand, the product manufacturer 4 makes an elaborate production plan in order to avoid overstocking of a large amount of products by overproduction, occurrence of shortage of supply due to failure to flexibly meet ordering demands, or the like. A need then inevitably arises to adopt specifications such that production of a component part using a virgin material is allowed by considering the instable productivity, while it is essentially desirable to exclusively produce the component part using the regenerated material. It is ideal for the part manufacturer 3 receiving an order according to such specifications to perform part production in such a manner that the regenerated material is preferentially used and the virgin material is substituted when the usable amount of the regenerated material becomes zero. In such part production, however, a need arises for a program change or the like accompanying change of materials, resulting in a reduction in productivity. For this reason, the part manufacturer 3 necessarily prefers to use the virgin material only. The regenerated material and the recovered material are then left in the material regeneration facility and the pulverization facility without being used. Then it becomes necessary to dispose of the materials by "OMR", "reduction to raw material" or "energy recovery" outside the loop. Thus, the system is hindered from being smoothly operated in the "CMR" mode.

To enable the system to be smoothly operated in the "CMR" mode, a method may be used in which the regenerated material is produced by setting the mixing ratio of the recovered material to the virgin material to a sufficiently low value such that the recovered material is always stocked at hand in the pulverization facility even if the amount of products recovered from users varies. This method, however, allows the amount of the stocked recovered material from increasing gradually under the pulverization facility to such an extent that a need arises to dispose of, outside the "CMR" mode loop, an excess amount of the material which cannot be held. In this case, recycling of a low efficiency results such that the most of the recovered material is disposed of outside the "CMR" mode loop, while only part of the recovered material is smoothly disposed of in the "CMR" mode.

The outline of the present invention will now be described.

According to the present invention, the amount of a recovered material used in a product is definitely determined, in contrast with the conventional art in which the amount of a recovered material used in a product is not definitely determined. The amount of a recovered material used in a product can be determined by determining the mixing ratio of the recovered material and a virgin material for production of a regenerated material and by determining the breakdown of ordered component parts into component parts using the virgin material and component parts using the regenerated material. That is, if the mixing ratio and the breakdown are determined, the total amount of the recovered material to be used in all products produced in a certain time period is determined. In determination of the amount of the recovered material to be used, at least one of the amount of recovered component parts, the amount of production of the recovered material and the amount of production of the regenerated material and a plan to produce the product are considered, thereby avoiding occurrence of shortage of the recovered material necessary for production of the product or the like.

Discussion will be concretely made, for example, with respect to a plan to produce a product within a certain time period (hereinafter referred to as "entire period") and with respect to a partial time period in the entire time period. This partial time period is equal to or shorter than the time period required for the flow of a recovered used component part to a product production facility such as a product manufacturer while being successively changed into a recovered material, a regenerated material and a component part using the regenerated material, and is suitable for determining, by considering all factors, the amount of the recovered material to be used in all products in this time period.

Production of the regenerated-material-using component part necessary for the number of the products produced in the partial time period (e.g., an outer cover) is started at a stage is before the beginning of the partial time period (which stage is hereinafter referred to as a "stage at which production of the regenerated-material-using component part is started"). Further, production of the regenerated material (e.g., a generated plastic) used in the regenerated-material-using component part and production of the recovered material (e.g., a recovered plastic) used in the regenerated material are respectively started at earlier stages (hereinafter referred to respectively as a "stage at which production of the regenerated material is started" and a "stage at which production of the recovered material is started").

If the stock of each of the recovered material and the regenerated material becomes zero at the stage at which production of the recovered material is started, there is a need to produce the products in the above-mentioned partial time period by using only the amount of recovered used parts at the corresponding point in time (the stock before the corresponding point in time and the recovered amount in a certain time period before the corresponding point in time). This is because only the used component parts existing at the "stage at which production of the recovered material is started" are supplied to the product production facility immediately before the above-mentioned partial time period by being successively changed into the recovered material, the regenerated material and the regenerated-material-using component part.

Nevertheless, failure to supply the planned amount of regenerated-material-using component parts to the product production facility in the above-mentioned partial time period occurs if the amount exceeding the recovered amount is required. Conventionally, in such a case, the product production facility gives an order by ambiguously specifying component parts, e.g., an order requesting "A number of items consisting of either of regenerated-material-using component parts and virgin-material component parts". Shortage of the supply of regenerated-material-using component parts to the product production facility occurs because, while the amount of used component parts allocable for production of the product and, hence, the amount of the recovered material is determined at the "stage at which production of the recovered material is started", an amount of the recovered material larger than the determined amount is requested.

If the amount of the recovered material used in the products is limited within the range of the amount corresponding to the amount of recovered used component parts, shortage of the supply of regenerated-material-using component parts to the product production facility does not occur. To limit the amount of the recovered material in the products within this range, an order for component parts may be given by specifying the component parts according to the amount of recovered used component parts. More specifically, examination is made as to whether regenerated-material-using component parts alone suffice for the production according to the plan on the basis of the amount of recovered used component parts, the number of products to be produced within the above-mentioned partial time period according to the production plan, etc. If they do not suffice, an order is given by explicitly describing the breakdown, e.g., "including B number of virgin-material component parts in A number of component parts". In this manner, the product production facility can make a part production facility (e.g., a part manufacturer) produce regenerated-material-using component parts (e.g., rebuilt outer covers) with reliability while avoiding failure to supply the necessary amount of regenerated-material-using component parts.

If there is some stock of the recovered material or the regenerated material at the "stage at which production of the recovered material is started", the stock can be used for production of the products in addition to the amount of recovered used component parts. It is possible to avoid occurrence of "shortage of regenerated-material-using component parts" by at least referring to the received amount.

In a case where examination is made as to sufficiency/deficiency not at the "stage at which production of the recovered material is started" but at the "stage at which production of the regenerated material is started", at least the amount of production of the recovered material (the stock at this stage and the amount of production at a stage a predetermined time period before this stage) may be referred to.

In a case where examination is made as to sufficiency/deficiency at the "stage at which production of the regenerated-material-using component part is started", at least the amount of production of the regenerated material (the stock at this stage and the amount of production at a stage a predetermined time period before this stage) may be referred to.

Also, if the mixing ratio of the recovered material and the virgin material at the time of production of the regenerated material is allowed to be varied, it is possible to give an order not by designating only regenerated-material-using component parts instead of explicitly describing the breakdown of the component parts. More specifically, operations described below may be performed. That is, at least one of the amount of recovered used component parts and the amount of production of the recovered material at the "stage at which production of the recovered material is started" or at the "stage at which production of the regenerated material is started" is examined and the amount of the recovered material allocable per product is also examined on the basis of the production plan. Examination is then made as to selection of the mixing ratio of the recovered material and the virgin material in the regenerated-material-using component parts for limitation to the allocated amount. The material regeneration facility may be notified of the result of this examination.

Thus, even in a case where the order is given to the part production facility only for regenerated-material-using component parts, the amount of regenerated material necessary for the production according to the order can be supplied with reliability. Moreover, occurrence of a state in which a large amount of the recovered material or the regenerated material is left in the "CMR" loop without being used can be avoided by producing the regenerated-material-using component parts with reliability.

Thus, according to the present invention, the amount of a recovered material used in a product is obtained on the basis of the amount of recovered used component parts, the amount of production of a recovered material or the amount of production of a regenerated material, and a production plan, thereby enabling "CMR" to be smoothly performed while reducing the amount of the recovered material disposed of outside the "CMR" loop.

A recycling method, a production producing method, a part ordering method, a mixing ratio determination method, an information processing apparatus and a program to which the present invention is applied will be described below in detail.

Description will be first made of a recycling method according to a first embodiment of the present invention and an information processing apparatus used for the recycling method. The recycling method is "PCMR" carried out by a product manufacturer which produces a copying machine, and the information processing apparatus is used for "PCMR".

Figure 2:
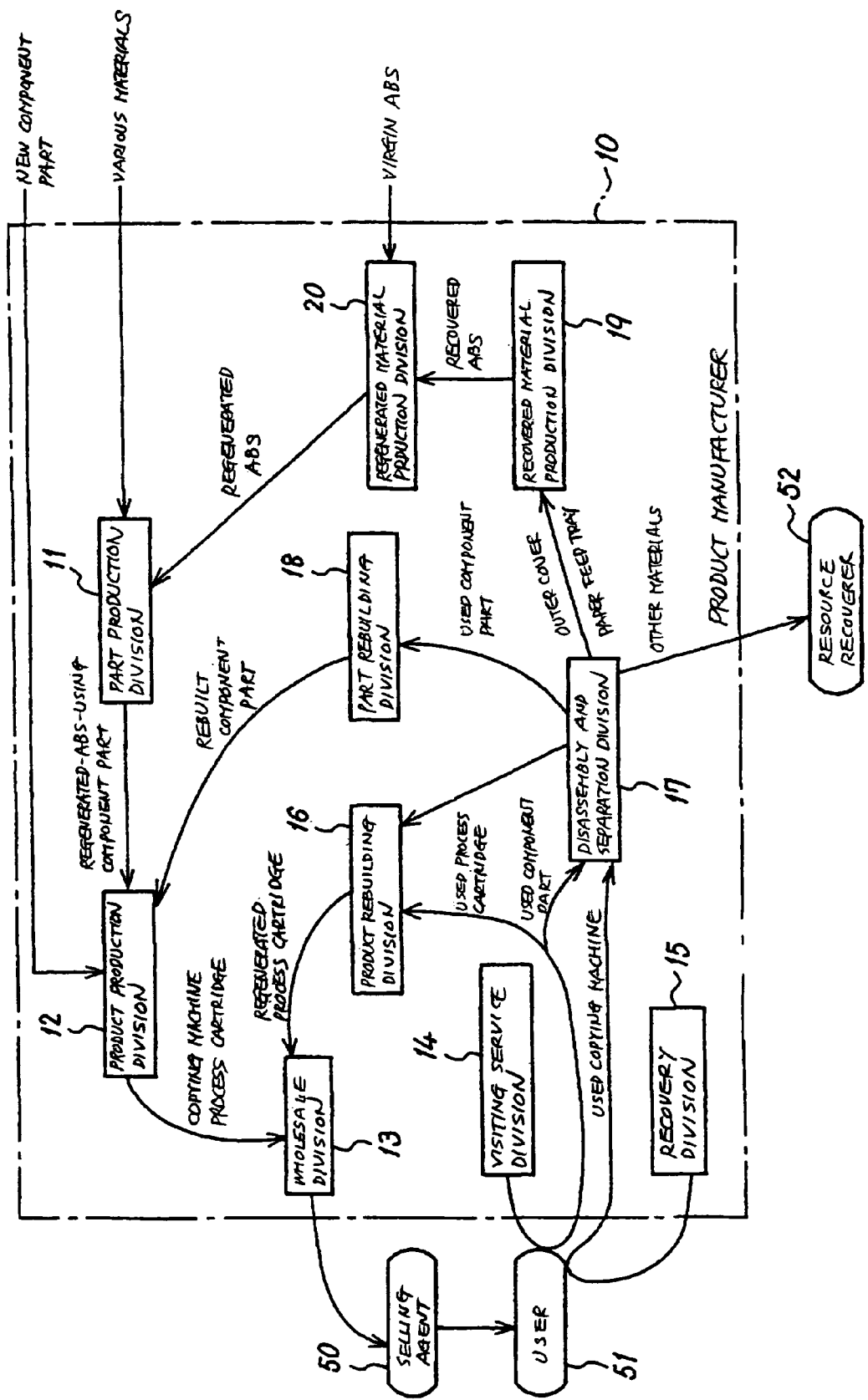
FIG. 2 is a flow diagram showing flows of "PCMR" performed by a product manufacturer according to a first embodiment of the present invention.

FIG. 2 shows flows of "PCMR" performed by the product manufacturer 10. The product manufacturer 10 is constituted by a part production division 11, a product production division 12, a wholesale division 13, a visiting service division 14, a recovery division 15, a product rebuilding division 16, a disassembly and separation division 17, a part rebuilding division 18, a recovered material production division 19, and a regenerated material production division 20. The part production division 11 produces an outer cover, a paper feed tray, a fixing unit, a power supply circuit, an optical unit, a photosensitive member, etc, which are components for a copying machine. The outer cover and the paper feed tray are produced from an acrylonitrile-butadiene-styrene (hereinafter referred to as "ABS") resin provided as a component part material. This ABS is regenerated ABS which is not a material formed only of a virgin material but a regenerated material obtained by mixing a regenerated material and a virgin material. Accordingly, the part production division 11 performs a part production process for producing component parts by using regenerated materials.

The product production division 12 produces a copying machine as a product by assembling the various component parts produced by the part production division 11. The product production division 12 performs a product production process for producing the product by assembling the component parts. The produced copying machine is wholesaled to a selling agent 50, etc., through the wholesale division 13 and is thereafter sold to a user 51. With printing out under the user 51, a toner in the toner cartridge is consumed. The toner cartridge from which the toner is emptied is manually replenished with new toner by the user 51, thus recycling the material of the toner cartridge.

A member in the visiting service division 14 visits the user 51 at an inspection request or the like and performs maintenance of the copying machine. If the product process cartridge (PrC) and some of the component parts are replaced, the visiting member receives the used process cartridge and component parts from the user 51 and delivers them to the product rebuilding division 16 and the disassembly and separation division 17.

When the copying machine owned by the user 51 becomes unusable, the recovery division 15 recovers the copying machine from the user 51 by receiving a request from the user 51 or the selling agent 50 or the like which has sold a new copying machine, and delivers the recovered copying machine to the disassembly and separation division 17. The recovery division 15 performs a recovery process for recovering used component parts from consumers, e.g., the user 51.

The disassembly and separation division 17 disassembles the used copying machine (including used component parts) received from the recovery division 15. Of the products obtained by disassembly (e.g., the process cartridges), those rebuildable are delivered to the product rebuilding division 16. Those not rebuildable are further disassembled into unit parts. By the above-described disassembly and receiving from the visiting service division 14, a number of used component parts, e.g., the fixing unit, the power supply circuit, the optical device (laser writing unit), the photosensitive member, the outer cover and the paper feed tray are obtained. Of the obtained used component parts, those rebuildable are delivered to the part rebuilding division 18. Those not rebuildable are further disassembled into unit materials such as iron, stainless steel and plastics and are separated into material groups. Of the separated materials, plastic materials other than metals and ABS are delivered to a resource recoverer 52. The delivered materials are recycled by reduction to raw materials or energy recovery. On the other hand, ABS is delivered to the recovered material production division 19. In the above-described copying machine, the outer cover and the paper feed tray correspond to this ABS.

The product rebuilding division 16 overhauls and rebuilds a product, or the process cartridge, received from the visiting service division 14 or the disassembly and separation division 17, and delivers the rebuilt process cartridge to the wholesale division 13. The above-described part rebuilding division 11 overhauls and rebuilds the used component parts (e.g., the fixing unit and the power supply circuit) received from the visiting service division 14 or the disassembly and separation division 17, and delivers the rebuilt component parts to the wholesale division 13.

The recovered material production division 19 produces recovered ABS obtained as a recovered material in such a manner that the outer cover and the paper feed tray made of ABS and received from the disassembly and separation division 17 are finely pulverized into 4 to 10 [mm] pieces by a pulverization means. In the product manufacturer 10, the disassembly and separation division 17 and the recovered material production division 19 operate integrally with each other to perform a recovered material production process for producing recovered materials by disassembling used component parts. If the plastic product recycling apparatus disclosed in Japanese Patent Laid-Open No. 2002-263581 is used as the above-mentioned pulverization means, a recovered material of a high purity can be manufactured with safety.

The regenerated material production division 20 produces regenerated ABS as a regenerated material by mixing the recovered ABS produced in the recovered material production division 19 with virgin ABS containing no recovered material. The regenerated material production division 20 performs a regenerated material production process for producing a regenerated material by mixing a recovered material with a virgin material containing no recovered material. The produced regenerated ABS is supplied to the part production division 11 to be recycled as a component part material.

Figure 3:
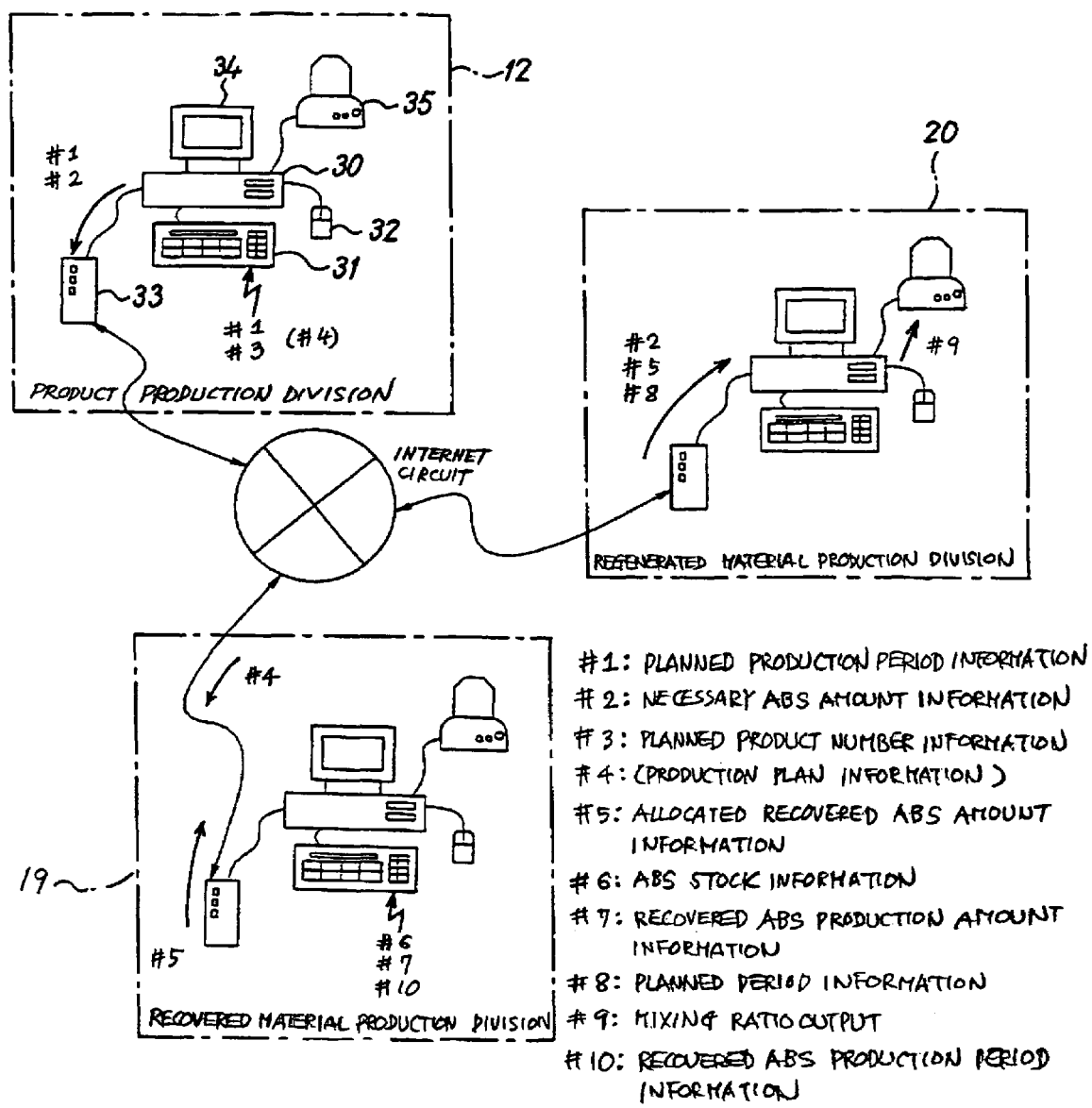
FIG. 3 is a diagram schematically showing the configuration of an information processing apparatus provided in the product manufacturer.

FIG. 3 shows the configuration of an information processing apparatus provided in the above-described product manufacturer 10. This information processing apparatus is constituted by three computer systems (each referred to as a personal computer, hereinafter) respectively provided in the product production division 12, the recovered material production division 19 and the regenerated material production division 20. Each of the personal computers has a main unit 30 which is constituted by a central processing unit (CPU) and which functions as a computation means, a keyboard 31, a mouse 32, a modem 33, a display 34, and a printer 35. In these components, the keyboard 31 and the mouse 32 function as information input means for accepting input of information to the main unit 30 or the computation means. The display 34 and the printer 35 function as information output means for outputting the results of computation performed by the main unit 30 or the computation means. The modem 33 functions as an information input means for accepting input of information from an external circuit to the main unit 30 and also as an information output means for accepting output of information from the main unit 30 to the external circuit. Further, a recording medium read/write means such as a flexible disk drive attached to the main unit 30 also functions as an information input means and as an information output means.

An operator in the product production division 12 inputs product plan information including information on a planned number of products and information on a plurality of planned production periods (corresponding to the above-described partial time period) with respect to the copying machine to the main unit 30 of the personal computer by using the keyboard 31 and the mouse 32 as required. In the main unit of the personal computer in the product production division 12, a program for enabling the main unit 30 of the personal computer to perform computational processing described below is installed. That is, processing is performed to compute necessary ABS amount information, i.e., information on the total necessary amount of ABS for production of the planned number of products, on the basis of one-product necessary amount information on the amount of ABS necessary for production of one copying machine and the above-mentioned planned product number information. The one-product necessary amount information is stored in a storage means such as a hard disk in advance. The planned production period information input to the main unit 30 is output to the personal computers in the recovered material production division 19 and the regenerated material production division 20 via the modem 33 and the Internet circuit. The computed necessary ABS amount information is output to the personal computer in the regenerated material production division 20 via the modem 33 and the Internet circuit.

The program in accordance with the present invention can be distributed or obtained in a state of being recorded on a recording medium such as a CD-ROM. The program can also be distributed or obtained in such a manner that a signal carrying this program and transmitted by a predetermined transmitter is distributed and received via a transmission medium such as a public telephone line, a private line or any of other communication networks. During this distribution, only a portion of the program may be transmitted via the transmission medium. That is, it is not necessary that all data constituting the program exist on the transmission medium at a time. The signal carrying the program is a computer data signal realized on a predetermined carrier including the program. The method of transmitting the program from the predetermined transmitter comprises continuously transmitting the data constituting the program and intermittently transmitting the data.

An operator in the recovered material production division 19 inputs recovered ABS stock information, recovered ABS production amount information, and recovered ABS production period information, which is information on the time period required for production of the recovered ABS, and other information to the main unit 30 of the personal computer by using the keyboard 31 and the mouse 32 as required. The operator also stores in the storage means the above-mentioned planned production period information sent from the personal computer in the product production division 12. In this main unit 30, a program for executing computational processing for computing recovered ABS allocation information is installed. Recovered ABS allocation information is information indicating what amount of recovered ABS is allocable in the planned production period in which production of the copying machine is planned in the amount of recovered ABS produced in the recovered material production division 19. This information is computed on the basis of the recovered ABS stock information, recovered ABS production amount information and recovered ABS production period information stored in advance and the above-mentioned planned production period information sent from the product production division 12.

For example, if the above-mentioned planned production period is 10 days, and if the time period from a time at which recovered ABS is produced to a time at which the recovered ABS is supplied to the product production division 12 by being successively changed into regenerated ABS and a regenerated-material-using component part, i.e., a regenerated-ABS-using component part, is 40 days, then the recovered ABS produced in the time period from the point in time 50 days before the beginning of the above-mentioned planned production period to the point in time 40 days before the planned production period can be allocated for production of the copying machine in the planned production period. In addition to this, the recovered ABS stock at the point in time 50 days before the beginning of the planned production period can be allocated for the corresponding production.

For the above-described allocation, the recovered ABS stock information is first reset to zero at the point in time 50 days before, and the corresponding stock is formed as stock allocation information. Subsequently, at the point in time 40 days before, all recovered ABS production amount information items corresponding to the time period from the point in time 50 days before to the point in time 40 days before are searched on the basis of a plurality of combinations of the recovered ABS production amount information and recovered ABS production period information stored in the storage means. The value obtained by adding the accumulation of the search results and the above-mentioned stock allocation is obtained as recovered ABS allocation information. The obtained recovered ABS allocation information is output together with the planned production period information to the personal computer in the regenerated material production division 20 via the modem 33 and the Internet circuit.

On the other hand, an operator in the regenerated material production division 20 stores, in the storage means in the main unit 30, as required, the planned production period information and the corresponding necessary ABS amount information sent from the personal computer in the product production division 12. The operator also stores in the storage means in the main unit 30 the planned production period information and the corresponding recovered ABS allocation information sent from the personal computer in the recovered material production division 19. In this main unit 30, a program for executing computational processing for computing the mixing ratio is installed. The mixing ratio is a value representing the ratio of the recovered ABS and the virgin ABS when the regenerated ABS is produced in the regenerated material production division 20. The mixing ratio is obtained on the basis of the planned production period information, the necessary ABS amount information, the recovered ABS allocation information and so on sent from the product production division 12 and the recovered material production division 19. The mixing ratio may be expressed in either percent by weight or percent by volume.

If the entire allocated amount indicated by the recovered ABS allocation information is allocated, the mixing ratio (regenerated ABS:virgin ABS) can be easily obtained as "allocated recovered ABS amount: (necessary ABS amount−allocated recovered ABS amount)". However, if the entire allocated recovered ABS amount is allocated, shortage of the recovered ABS occurs in the event that an amount of recovered ABS larger than the expected value is used for some reason, for example, in the event that the production is redone because of occurrence of defectives.

In the above-described computational processing, therefore, the allocated recovered ABS amount is corrected to a slightly smaller value by multiplication using a predetermined coefficient. The mixing ratio is obtained on the basis of the allocated recovered ABS amount after the correction and the necessary ABS amount. The obtained mixing ratio is output through the display of the personal computer or onto a printing paper sheet to be referred to by the operator in the regenerated production division 20. The operator produces the regenerated ABS by mixing the recovered ABS and the virgin ABS at the obtained mixing ratio in the time period corresponding to "from the point in time 50 days before to the point in time 40 days before" (slightly delayed relative to the recovered material production time). Since the produced regenerated ABS is used in the product after being changed into the regenerated-ABS-using component part, the amount of the recovered ABS used in the copying machine in the above-mentioned planned production period is determined at the point in time at which the above-described mixing ratio is obtained.

Thus, in the "PCMR" and the information processing apparatus according to the first embodiment of the present invention, the amount of the recovered material used in the product, i.e., the copying machine, is determined on the basis of the production plan information representing the product production plan and the recovered ABS production amount information representing the amount of production of the recovered material.

If the mixing ratio is determined as described above and if the regenerated ABS is produced according to the mixing ratio, the amount of recovered ABS used for production of the copying machine can be efficiently used by being limited within the range of the amount of recovery of the used parts, i.e., the outer cover and the paper feed tray. Also, production of the regenerated ABS can be continued while avoiding occurrence of failure to supply the necessary amount of regenerated ABS. Thus, "PCMR" can be smoothly performed while reducing the amount of recovered ABS disposed of outside the "PCMR" loop.

The above-described allocated recovered ABS amount can be computed by using information on the amounts of recovery of the used parts, i.e., the outer cover and the paper feed tray, instead of the recovered ABS production amount information. Also, the amount of recovery of the used component parts, i.e., the outer cover and the paper feed tray, can be computed on the basis of the amount of recovery of the copying machine. However, some copying machines having the outer cover or the paper feed tray chipped or lost may be recovered. For this reason, the allocated recovered ABS amount based on the amount of recovery of the outer cover and the paper feed tray can be obtained with higher accuracy to reliably limit shortage of the supply of the regenerated ABS in comparison with the recovered ABS allocation amount based on the amount of recovery of the copying machine. Also, some amount of loss occurs inevitably in the total amount of the recovered outer covers and paper feed trays at the time of production of the recovered ABS in the recovered material production division 19. Therefore, the reliability with which shortage of the supply of the regenerated ABS is limited on the basis of the recovered ABS production amount information is higher.

An example of modification of "PCMR" and the information processing apparatus will next be described.

In this example of modification, the regenerated ABS is produced by constantly maintaining the mixing ratio of the recovered ABS and the virgin ABS for a long period of time in the regenerated material production division 20. Also, an information processing apparatus which performs computational processing for obtaining the use ratio instead of the above-described mixing ratio is used. The use ratio is the ratio of regenerated-ABS-using component parts and virgin-ABS component parts used for production of the copying machine. Virgin-ABS component parts are component parts in which only the virgin ABS is used as an ABS material (the outer cover and the paper feed tray).

Figure 4:
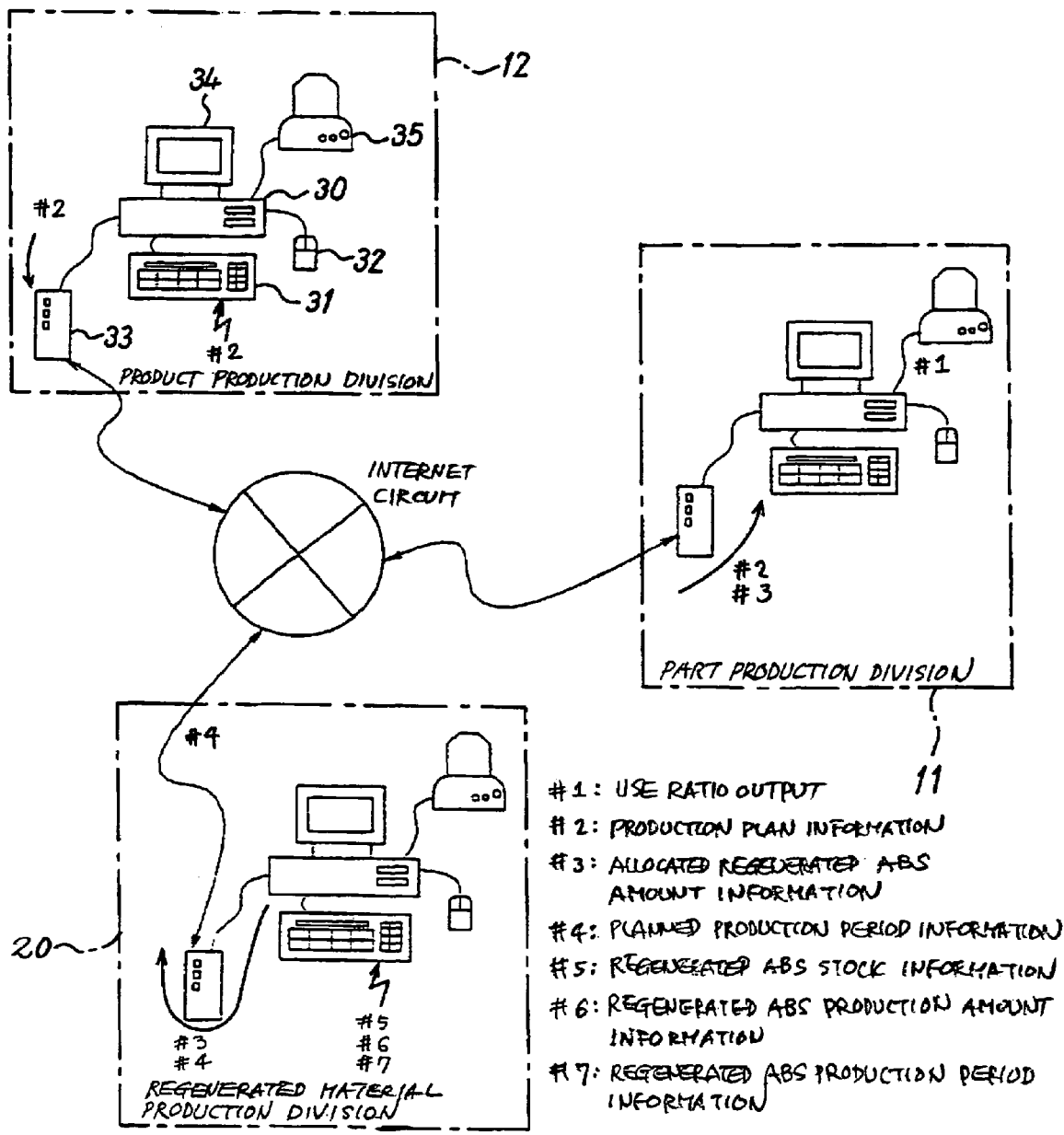
FIG. 4 is a diagram schematically showing the configuration of an information processing apparatus provided in the product manufacturer which performs "PCMR" according to an example of modification of the first embodiment.

FIG. 4 shows the configuration of the information processing apparatus provided in the product manufacturer 10 in this example of modification. This information processing apparatus is constituted by three personal computers respectively provided in the product production division 12, the regenerated material production division 20 and the part production division 11. Production plan information (including planned product number information and planned production period information) input to the main unit 30 of the personal computer in the product production division 12 is output to the personal computers in the regenerated material production division 20 and the part production division 11 via the modem 33 and the Internet circuit.

An operator in the regenerated material production division 20 inputs regenerated ABS stock information, regenerated ABS production amount information, and regenerated ABS production period information, which is information on the time period required for production of the regenerated ABS, and other information to the main unit 30 of the personal computer by using the keyboard 31 and the mouse 32 as required. The operator also stores in the storage means the above-mentioned planned production period information sent from the personal computer in the product production division 12. In this main unit 30, a program for executing computational processing for computing regenerated ABS allocation information is installed. Regenerated ABS allocation information is information indicating what amount of regenerated ABS is allocable in the planned production period in which production of the copying machine is planned in the amount of regenerated ABS produced in the regenerated material production division 20. This information is computed on the basis of the regenerated ABS stock information, regenerated ABS production amount information and regenerated ABS production period information stored in advance and the above-mentioned planned production period information sent from the product production division 12.

For example, if the above-mentioned planned production period is 10 days, and if the time period from a time at which regenerated ABS is produced to a time at which the regenerated ABS is supplied to the product production division 12 by being changed into a regenerated-ABS-using component part is 30 days, then the regenerated ABS produced in the time period from the point in time 40 days before the beginning of the above-mentioned planned production period to the point in time 30 days before the planned production period can be allocated for production of the copying machine in the planned production period. In addition to this, the regenerated ABS stock at the point in time 40 days before the beginning of the planned production period can be allocated for the corresponding production.

For the above-described allocation, the recovered ABS stock information is first reset to zero at the point in time 40 days before, and the corresponding stock is formed as stock allocation information. Subsequently, at the point in time 30 days before, all regenerated ABS production amount information items corresponding to the time period from the point in time 40 days before to the point in time 30 days before are searched on the basis of a plurality of combinations of the regenerated ABS production amount information and regenerated ABS production period information stored in the storage means. The value obtained by adding the accumulation of the search results and the above-mentioned stock allocation is obtained as regenerated ABS allocation information. The obtained regenerated ABS allocation information is output together with the planned production period information to the personal computer in the product production division 11 via the modem 33 and the Internet circuit.

On the other hand, an operator in the product production division 11 stores, in the storage means in the main unit 30, as required, the planned production period information and the corresponding necessary ABS amount information sent from the personal computer in the product production division 12. The operator also stores in the storage means in the main unit 30 the planned production period information and the corresponding regenerated ABS allocation information sent from the personal computer in the regenerated material production division 20. In this main unit 30, a program for executing computational processing for computing the above-described use ratio on the basis of the planned production period information, the planned product number information, the regenerated ABS allocation information and so on sent from the product production division 12 and the regenerated material production division 20 is installed.

The following are details of this computational processing. That is, in this example of modification, the amount of the regenerated ABS necessary for one regenerated-ABS-using component part is previously known since the mixing ratio of the recovered ABS and the virgin ABS in the regenerated ABS is constant. Also, the amount of regenerated-ABS-using component parts necessary for one copying machine is previously known. The amount of regenerated-ABS-using component parts required in the above-mentioned planned production period (hereinafter referred to as the planned regenerated part use amount) can be obtained from the above-mentioned product number information and the amount of regenerated-ABS-using component parts necessary for one copying machine. Further, the amount of regenerated-ABS-using component parts which can be supplied to the product production division 12 in the above-mentioned planned production period (hereinafter referred to as the planned regenerated part supply amount) can be obtained on the basis of the above-mentioned regenerated ABS allocation information sent from the regenerated material production division 20.

In the above-mentioned computational processing, the planned regenerated part use amount and the planned regenerated part supply amount are first obtained. If "planned regenerated part use amount≦planned regenerated part supply amount", the use ratio (regenerated-ABS-using component parts:virgin-ABS component parts) is set to "100:0". All the ABS component parts used in the planned production period are determined as regenerated-ABS-using component parts. On the other hand, if "planned regenerated part use amount>planned regenerated part supply amount", the user ratio is set as "planned regenerated part use supply amount: (planned regenerated part use amount−planned regenerated part supply amount)". The use ratio is determined so that virgin-ABS component parts are used in correspondence with the shortage of the supply in the case of using only regenerated-ABS-using component parts. The determined use ratio is output through the display of the personal computer or onto a printing paper sheet to be referred to by the operator in the part production division 11. Regenerated-ABS-using component parts and virgin-ABS component parts are produced according to the ratio.

Each of the regenerated-ABS-using component parts and virgin-ABS component parts produced in this manner is used for production of the copying machine in the above-mentioned planned production period. Since the mixing ratio of the recovered ABS and the virgin ABS in the regenerated-ABS-using component parts is constant during a long time period, the amount of the recovered ABS used in the copying machine in the above-mentioned planned production period is determined at the point in time at which the above-described mixing ratio is obtained.

Thus, in the "PCMR" and the information processing apparatus according to this example of modification, the amount of the recovered material used in the product, i.e., the copying machine, is determined on the basis of the production plan information representing the product production plan and the recovered ABS production amount information representing the amount of production of the recovered material.

If the use ratio is determined as described above and if regenerated-ABS-using component parts and virgin-ABS component parts are produced according to the use ratio, the amount of recovered ABS used for production of the copying machine can be efficiently used by being limited within the range of the amount of recovery of the used parts. Also, production of the regenerated ABS can be continued while avoiding occurrence of failure to supply the necessary amount of ABS component parts (regenerated-ABS-using component parts and virgin-ABS component parts). Further, since virgin-ABS component parts are produced in the amount corresponding to the shortage of the supply in the case of using only regenerated-ABS-using component parts, it is possible to avoid occurrence of a state in which a large amount of virgin-ABS component parts are stocked by considering the possibility of shortage of the supply of regenerated-ABS-using component parts to cause a bad stock. Consequently, "PCMR" can be smoothly performed while reducing the amount of recovered material disposed of outside the "PCMR" loop.

The above-described allocated regenerated ABS amount can be computed on the basis of the recovered ABS production amount information and the information on the amount of recovery of used components in place of the regenerated ABS production amount information. However, the entire amount of produced recovered ABS cannot be reliably used for production of the regenerated ABS, and some loss in the used amount occurs in ordinary cases. Also, not all the recovered used component parts are changed into recovered ABS, as already described. Therefore, the effect of reliably limiting shortage of the supply of the regenerated ABS on the basis of the regenerated ABS production amount information, the recovered ABS production amount information or the recovered amount information decreases in this order. The recovered amount information, the recovered ABS production amount information and the regenerated ABS production amount information are obtained in this order. Accordingly, the amount of the recovered ABS used in the copying machine in the planned production period can be determined earlier in this order.

A second embodiment of the present invention will be described with respect to a product producing method and so on carried out as a product producing method, a mixing ratio determination method and an information processing apparatus for these methods by the product manufacturer producing the copying machine.

Figure 5:
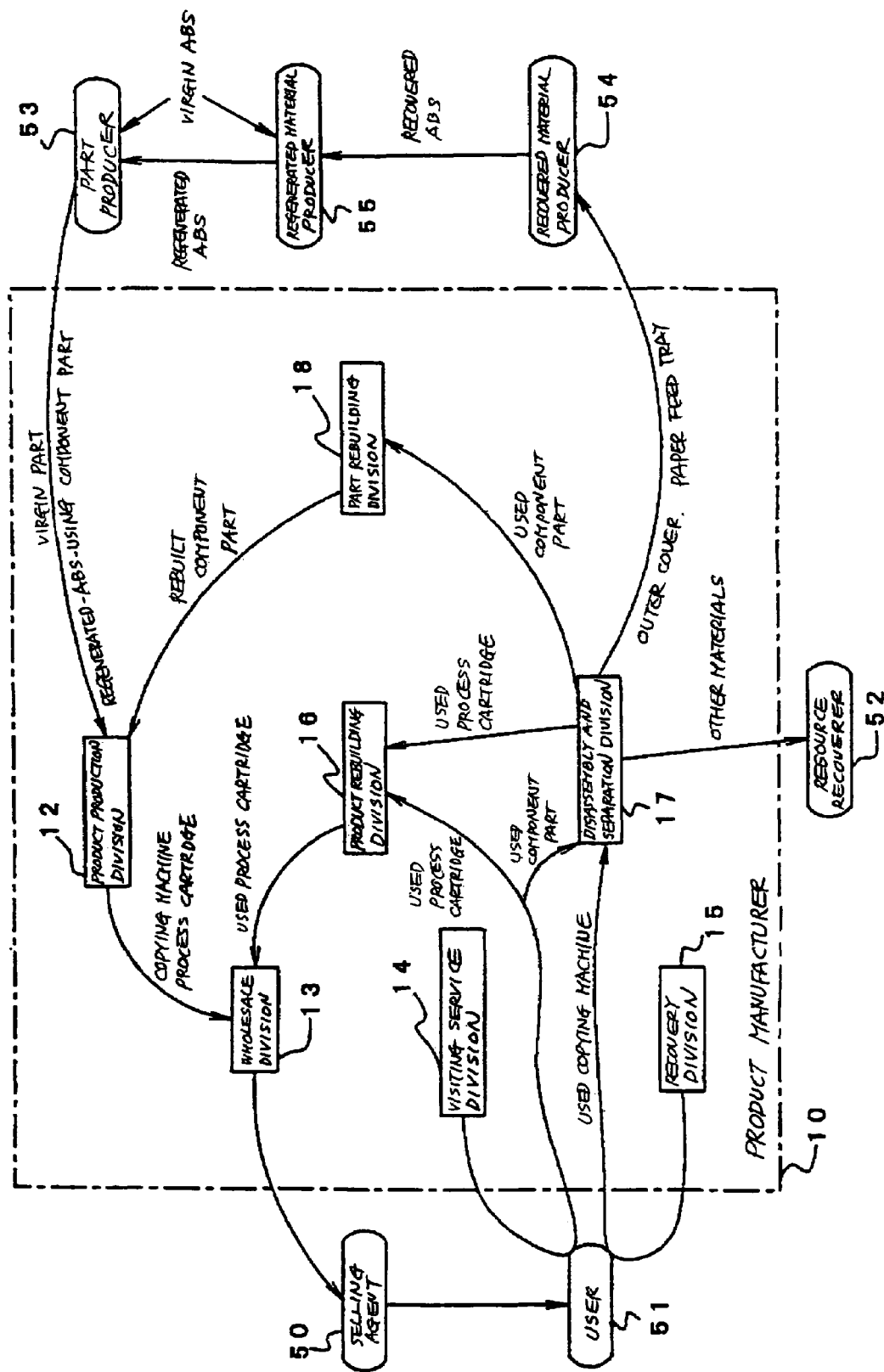
FIG. 5 is a flow diagram showing flows of materials in product production performed by the product manufacturer carrying out a product producing method according to a second embodiment of the present invention and a flow of a material through external facilities.

FIG. 5 shows flows of materials in production of products performed by the product manufacturer 10 and a flow of a material through external facilities. The flows of materials in this flow diagram are substantially the same as those shown in FIG. 2 but differ in respects described below. That is, the recovered ABS production process corresponding to the recovered material production process, the regenerated ABS production process corresponding to the regenerated material production process and the part production process are performed not by the product manufacturer 10 but by external facilities. More specifically, the outer cover and the paper feed tray separated by the disassembly and separation division 17 of the product manufacturer 10 are supplied to a recovered material producer 54 and are pulverized to produce recovered ABS under the recovered material producer 54. The recovered ABS is supplied to a regenerated material producer 55 and is used for production of a regenerated-ABS-using component part under a part producer 53.

The recovered material producer 54 contracts with the product manufacturer 10 and the regenerated material producer 55, as described below. That is, the recovered material producer 54 signs a contract therewith to deliver to the regenerated material producer 55 the entire amount of recovered ABS produced from used parts (the outer cover and the paper feed tray) received from the product manufacturer 10. The regenerated material producer 55 contracts with the product manufacturer 10 and the part producer 53, as described below. That is, the regenerated material producer 55 signs a contract therewith to deliver to the part producer 53 the entire amount of regenerated-ABS-using component parts using the recovered ABS derived from the used component parts recovered by the product manufacturer 10 in regenerated-ABS-using component parts produced by the regenerated material producer 55. The part producer 53 contracts with the product manufacturer 10, as described below. That is, the part producer 53 signs a contract therewith to deliver to the product manufacturer 10 the entire amount of regenerated-ABS-using component parts produced by using the regenerated ABS received from the regenerated material producer 55. On the basis of the plurality of contracts described above, substantially the entire amount of ABS in the used component parts recovered by the product manufacturer 10 is recycled as a portion of the product of the product manufacturer 10 without being disposed of outside the PCMR loop.

Figure 6:
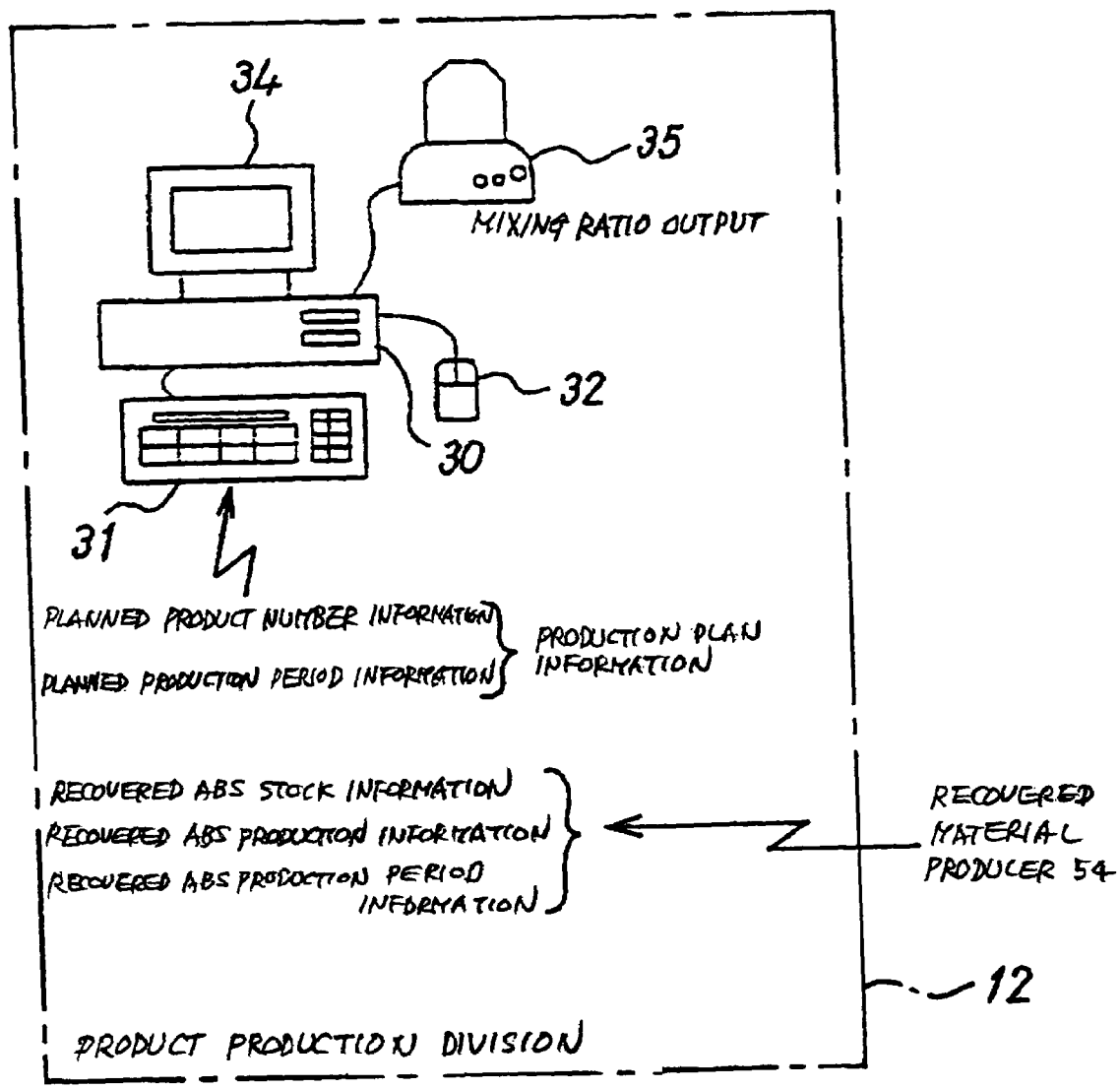
FIG. 6 is a diagram schematically showing a personal computer provided in the product production division of the product manufacturer.

FIG. 6 shows a personal computer provided in the product production division 12 of the product manufacturer 10. This personal computer has a main unit 30 which is constituted by CPU and which functions as a computation means, a keyboard 31, a mouse 32, a display 34, and a printer 35. An operator in the product production division 12 inputs product plan information including planned product number information and planned production period information with respect to a copying machine to the main unit 30 of the personal computer by using the keyboard 31 and the mouse 32 as required. The operator periodically contacts the recovered material producer 54 to extract recovered ABS stock information, which is information on the stock of recovered ABS produced from used component parts recovered by the product manufacturer 10, recovered ABS production amount information on the amount of production of the recovered ABS, and recovered ABS production period information on the period of time required for the production.

A program for performing computational processing for determining the mixing ratio of the recovered ABS and the virgin ABS when the regenerated ABS is produced by the recovered material producer 55 is installed in the main unit 30 of the personal computer. Details of this program are substantially the same as those of the program installed in the information processing apparatus in the above-described first embodiment. However, this program differs from the above-described one in that it is executed not by a plurality of personal computers connected to each other via the Internet circuit but by one personal computer.

More specifically, the necessary ABS amount information is first obtained from the planned production period information and the planned product number information. The recovered ABS allocation information is obtained on the basis of the planned production period information, the recovered ABS stock information, the recovered ABS production amount information and the recovered ABS production period information. The above-described mixing ratio is obtained on the basis of the planned production period information, the necessary ABS amount information and the recovered ABS allocation information. The obtained mixing ratio is output through the display of the personal computer or onto a printing paper sheet to be referred to by the operator in the regenerated production division 20. The operator notifies the regenerated material producer 55 that the regenerated ABS should be produced at the mixing ratio in the regenerated ABS production period corresponding to the above-mentioned planned production period.

The product manufacturer 10 using the information processing apparatus thus arranged uses the product producing method in which the amount of the recovered ABS used in the copying machine is determined on the basis of the amount of production of the recovered ABS and the plan to produce the product, i.e., the copying machine. The product manufacturer 10 also uses the mixing ratio determination method in which the above-described mixing ratio is determined on the basis of the amount of production of the recovered ABS and the copying machine production plan.

Figure 7:
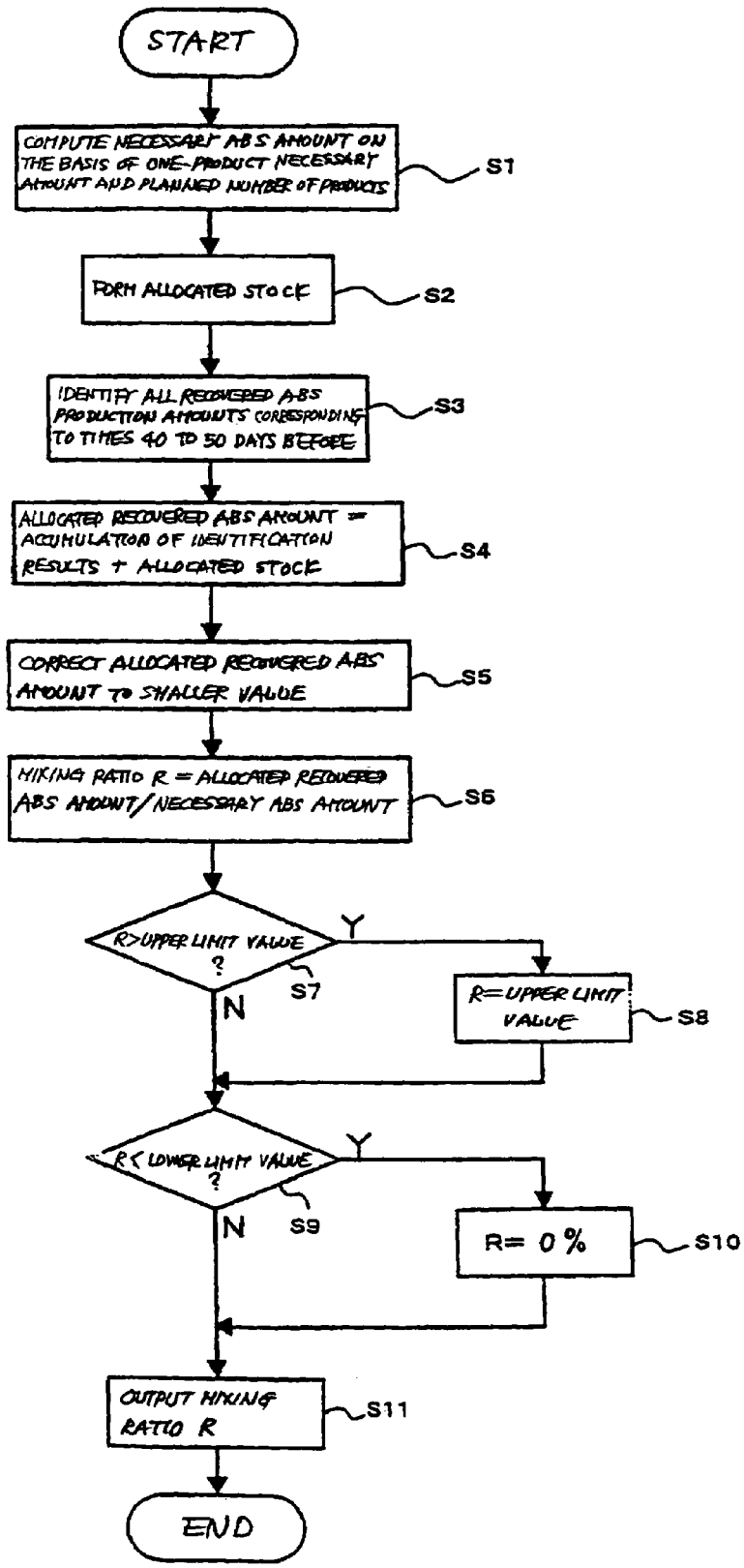
FIG. 7 is a flowchart showing the flow of computational processing executed by the main unit of the personal computer shown in FIG. 6.

FIG. 7 is a flowchart of computational processing performed by the main unit 30 of the personal computer provided as a computing device. FIG. 7 shows an example of processing in a case where the above-mentioned planned production period is 10 days and the time period from a time at which recovered ABS is produced to a time at which the produced recovered ABS is supplied to the product production division 12 after being successively changed into regenerated ABS and a regenerated-material-using component part, i.e., a regenerated-ABS-using component part, is 40 days.

The operator provides a starting instruction to start this computational processing. First, the necessary ABS amount, i.e., the total necessary amount of ABS for production of the planned number of products, is computed on the basis of the one-product necessary amount and the planned number of products stored in the storage means, e.g., a hard disk (step 1 ("step" will be hereinafter written as "S"). Subsequently, the recovered ABS stock is reset to zero according to the planned production period and the corresponding stock is formed as an allocated stock (S2). Not the entire recovered ABS stock is reset at the present point in time but the stock in the stock period corresponding to the planned production period is reset to zero. More specifically, the stock generated from the point in time at which the entire amount of recovered ABS corresponding to the preceding planned production period is shipped from the recovered material producer 54 to the point in time at which 50 days before the beginning of the present planned production period is reset to zero.

After the allocated stock has been formed, all the recovered ABS production amounts corresponding to the time period from the point in time 50 days before to the point in time 40 days before in a plurality of combinations of recovered ABS production amounts and recovered ABS production periods stored in the storage means are identified (S3). A allocated recovered ABS amount is computed by adding together the accumulation of the identified results and the allocated stock (S4), and the computation result is corrected to a slightly smaller value (S5). Subsequently, the mixing ratio R of the amount of recovered ABS to the entire amount of ABS is obtained based on a formula shown as equation (1) below (S6).

Mixing ratio $R$=allocated recovered ABS amount/ necessary $ABS$ amount     Equation (1)

Determination is thereafter made as to whether or not the obtained mixing ratio R exceeds a predetermined upper limit value, that is, whether or not the proportion of the recovered ABS in the mixing ratio of the recovered ABS and the virgin ABS exceeds a predetermined upper limit value (S7). If the proportion of the recovered ABS does not exceed the upper limit value (in the case of N in S7), the same value of the mixing ratio R as the computation result is used in subsequent processing. If the proportion of the recovered ABS exceeds the upper limit value (in the case of Y in S7), the value of the mixing ratio R is corrected to the upper limit value (S8) and the corrected value is used in subsequent processing. That is, computational processing for limiting the proportion of the recovered ABS in the mixing ratio of the recovered ABS and the virgin ABS to a value not larger than the upper limit value is performed.

Subsequently, determination is made as to whether or not the mixing ratio R is lower than a predetermined lower limit value, that is, whether or not the proportion of the recovered ABS in the mixing ratio of the recovered ABS and the virgin ABS is lower than a predetermined lower limit value (S9). If the proportion of the recovered ABS is not lower than the lower limit value (in the case of N in S9), the same value of the mixing ratio R as the computation result is used in subsequent processing. If the proportion of the recovered ABS is lower than the lower limit value (in the case of Y in S9), the value of the mixing ratio R is uniformly reduced to 0[%] (S10) and the corrected value is used in subsequent processing. Finally, the obtained mixing ratio R is printed on a printing paper sheet set in the printer 35 (S11). Then the processing flow ends.

In the above-described computational processing, the proportion of the recovered ABS in the regenerated ABS is limited to a value not larger than the predetermined upper limit value to avoid occurrence of an event in which the physical properties of the regenerated ABS are largely changed by mixing a large amount of recovered ABS in the virgin ABS. The physical properties of the regenerated ABS are thereby limited within tolerable ranges. In the "PCMR" loop, shortage of the recovered ABS is ordinarily caused by a long-period flow. Therefore, an event in which the mixing ratio R exceeds the predetermined upper limit is a temporary phenomenon. Even if the mixing ratio R exceeds the upper limit value, the amount of recovered ABS at a stage before the regenerated ABS production step starts decreasing after a while. Therefore, even if the mixing ratio R is limited to a value not larger than the upper limit value, the possibility of occurrence of a state in which a large amount of recovered ABS is left at a stage before the regenerated ABS production step is low.

Also in the above-described computational processing, the mixing ratio R is reduced to 0[%] when it becomes lower than the predetermined lower limit value to avoid a reduction in productivity of the regenerated ABS due to mixing of an extremely small amount of recovered ABS in the virgin ABS. A state in which the mixing ratio R is lower than the lower limit value during a long time period signifies that the allocated recovered ABS amount is overestimated. In such a case, wherefore, the coefficient for correcting the allocated recovered ABS amount may be reduced to thereafter maintain the mixing ratio R at or above the lower limit value with stability.

In the above-described product producing method and mixing ratio determination method according to the second embodiment of the present invention, the flow of the recovered ABS in "PCMR" is controlled to reduce the amount of recovered ABS disposed of outside the "PCMR" loop and to enable "PCMR" to be smoothly performed.

The allocated recovered ABS amount can be computed on the basis of the information on the amount of recovery of the used parts, i.e., the outer cover and the feed tray, in place of the recovered ABS production amount information, as in the case of the above-described first embodiment.

While an example of control of the flow of the recovered ABS in the PCMR loop performed by the product manufacturer 10 using the mixing ratio determination method according to the second embodiment has been described, the flow of the recovered ABS may alternatively be controlled by an external facility in the same manner. More specifically, one of a recoverer, the recovered material producer 54 and the regenerated material producer 55 to which the recovery operation is subcontracted from the product manufacturer 10 controls the flow of the recovered ABS. In the case of control of the flow of the recovered ABS performed by the recoverer, the recoverer may determine the above-described mixing ratio on the basis of the recovery amount information obtained by its recovery operation and the product plan information extracted from the product manufacturer 10. In the case of control of the flow of the recovered ABS performed by the recovered material producer 54, the recovered material producer 54 may determine the above-described mixing ratio on the basis of the recovered ABS production amount information obtained by its producing operation and the product plan information extracted from the product manufacturer 10. In the case of control of the flow of the recovered ABS performed by the regenerated material producer 55, the regenerated material producer 55 may determine the above-described mixing ratio on the basis of the recovery amount information or the recovered ABS production amount information extracted from the recoverer or the recovered material producer 54 and the product plan information extracted from the product manufacturer 10.

A third embodiment of the present invention will be described with respect to a part ordering method and so on carried out as a part ordering method to which the present invention is applied and an information processing apparatus for the method by a part ordering agent performing part ordering in place of the product manufacturer producing the copying machine. In the third embodiment, flows of materials in product production performed by the product manufacturer 10 and a flow of a material through external facilities are the same as those shown in FIG. 5. That is, also in the third embodiment, the recovered ABS is produced by the recovered material producer 54, the regenerated ABS is produced by the regenerated material producer 55, and a regenerated-ABS-producing component part is produced by the part producer 53.

Also in the third embodiment, a plurality of contracts described below are signed. That is, the recovered material producer 54 signs a contract with the product manufacturer 10 and the regenerated material producer 55 to deliver to the regenerated material producer 55 the entire amount of recovered ABS produced from used parts received from the product manufacturer 10. The regenerated material producer 55 contracts with the product manufacturer 10 and the part producer 53 to deliver to the part producer 53 the entire amount of regenerated-ABS-using component parts using the recovered ABS derived from the used component parts recovered by the product manufacturer 10. The part producer .53 contracts with the product manufacturer 10 to deliver to the product manufacturer 10 the entire amount of regenerated-ABS-using component parts derived from the regenerated ABS received from the regenerated material producer 55. Therefore, the ABS of the used component parts recovered by the product manufacturer 10 is recycled as a portion of the product of the product manufacturer 10 without being disposed of outside the PCMR loop.

Figure 8:
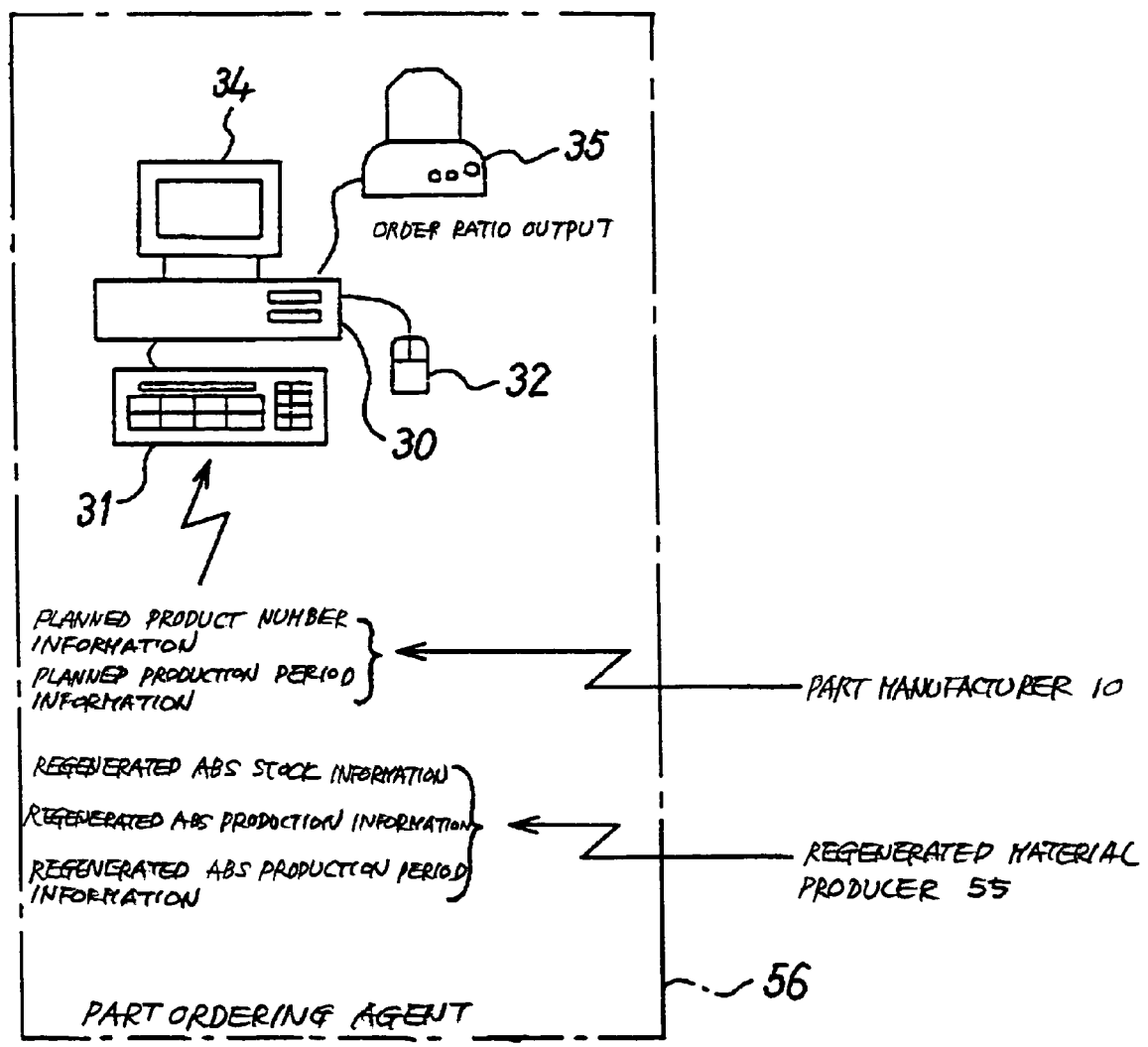
FIG. 8 is a diagram schematically showing a personal computer provided as an information processing apparatus for a part ordering agent to carry out a part ordering method according to a third embodiment of the present invention.

While the flow of component parts from the part producer 53 to the product production division 12 of the product manufacturer 10 is as shown in FIG. 5, not the product manufacturer 10 but the part ordering agent gives the part producer 53 an order for component parts. The mixing ratio of the recovered ABS and the virgin ABS in the regenerated ABS produced by the regenerated material producer 55 is constant over a long time period. FIG. 8 shows a personal computer provided as an information processing apparatus for the part ordering agent 56. This personal computer has a main unit 30 which is constituted by CPU and which functions as a computation means, a keyboard 31, a mouse 32, a display 34, and a printer 35. An operator in the part ordering agent 56 periodically extracts, from the product manufacturer 10, product plan information (including planned product number information and planned production period information) with respect to the copying machine, and inputs the information to the main unit 30 of the personal computer. The operator also contacts the recovered material producer 55 periodically to extract recovered ABS stock information, which is information on the stock of recovered ABS derived from used component parts recovered by the product manufacturer 10, recovered ABS production amount information on the amount of production of the recovered ABS, and recovered ABS production period information on the period of time required for the production. The operator inputs the obtained information to the main unit 30 of the personal computer 30.

A program for determining order ratio of regenerated-ABS-using component parts and virgin component parts on the basis of the various sorts of input information is installed in the main unit 30 of the personal computer. Details of this program are substantially the same as those of the program used to obtain the above-described use ratio and installed in the personal computer in the above-described example of modification. However, this program differs from the above-described one in that it is executed not by a plurality of personal computers connected to each other via the Internet circuit but by one personal computer.

Figure 9:
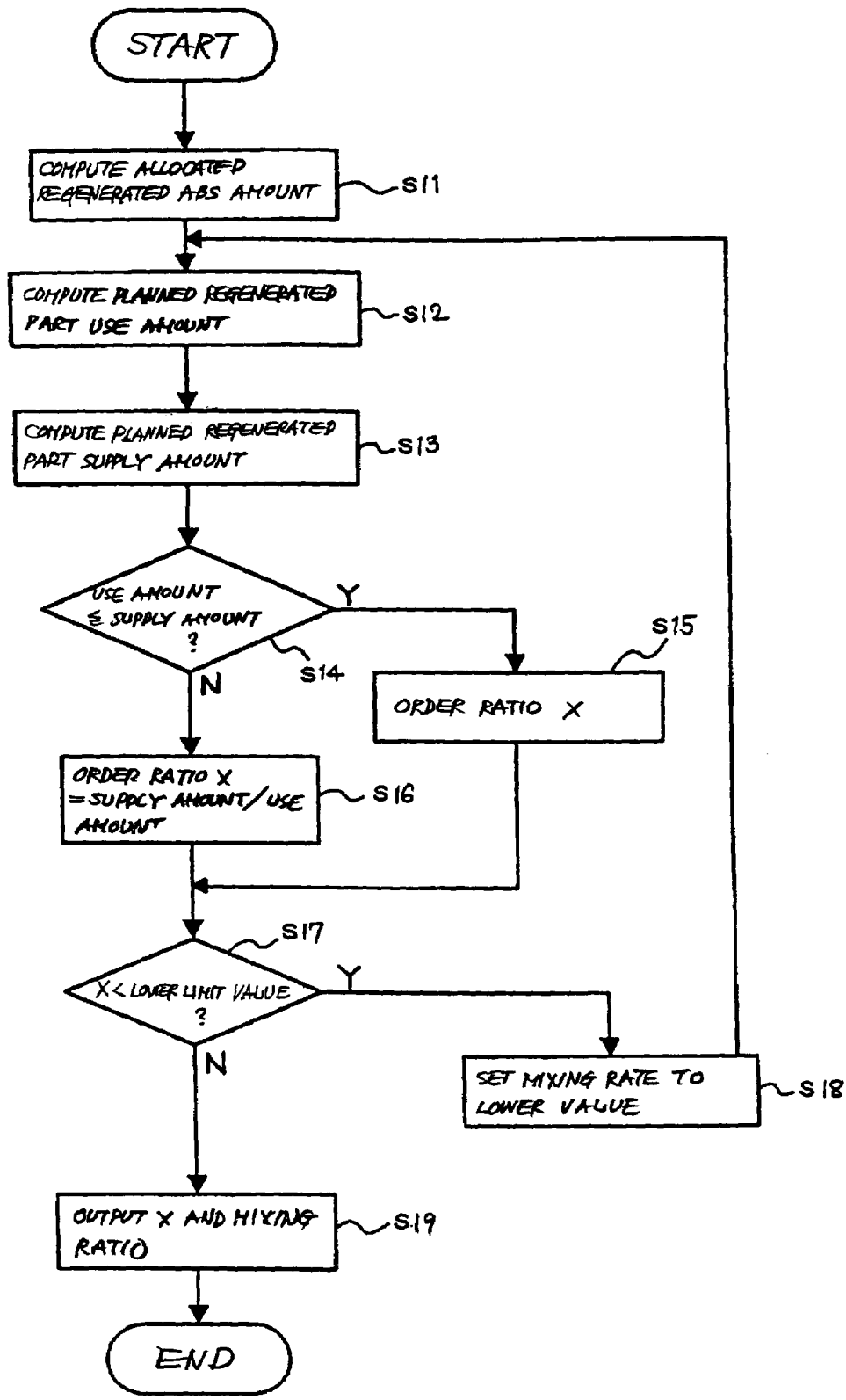
FIG. 9 is a flowchart showing the flow of computational processing executed by the main unit of the personal computer shown in FIG. 8.

FIG. 9 shows the flow of computational processing performed by the main unit 30 of the personal computer. provided as a computing device.

The operator provides a starting instruction to start this computational processing. First, the above-described allocated regenerated ABS amount is obtained on the basis of the regenerated ABS stock, the regenerated ABS production amount, the regenerated ABS production period and the planned production period stored in the storage means, e.g., a hard disk (S11). Subsequently, the planned regenerated part use amount is obtained on the basis of the planed number of products and the amount of regenerated-ABS-using components necessary for production of one copying machine (S12). Also, the planned regenerated part supply amount is obtained on the basis of the allocated regenerated ABS amount and the planned regenerated part use amount (S13). Determination is then made as to whether or not the planned regenerated part use amount is equal to or smaller than the planned regenerated part supply amount (S14). If the planned regenerated part use amount is equal to or smaller than the planned regenerated part supply amount (in the case of Y in S14), the order ratio X of regenerated-ABS-using component parts in the ordered ABS component parts is determined as 100[%] (S15). All the ABS component parts supplied to the product manufacturer 10 in the planned production period are determined as regenerated-ABS-using component parts. On the other hand, if the planned regenerated part use amount exceeds the planned regenerated part supply amount (in the case of N in S14), the order ratio X is determined on the basis of a formula shown as equation (2) below (S16). The order ratio X is determined so that the amount of virgin ABS components corresponding to the shortage of the supply in the case of using only regenerated-ABS-using component parts is supplied.

Order ratio $X$=planned regenerated part supply amount/planned regenerated part use amount  Equation (2)

Determination is thereafter made as to whether or not the determined order ratio X is lower than a predetermined lower limit value (S17). If the determined order ratio X is not lower than a predetermined lower limit value (N), the same value is used in subsequent processing. If the determined order ratio X is lower than a predetermined lower limit value (Y in S17), the mixing ratio of the recovered ABS to the virgin ABS at the time of production of the regenerated ABS is changed to a lower value (S18) and a loop in the control flow for return to S2 is used. After the planned regenerated part use amount and so on are updated by this loop on the basis of the changed mixing ratio, the above-described determination in S17 is again made. The mixing ratio is thereby repeatedly changed to a lower value until the order ratio X becomes equal to or larger than the lower limit value. The order ratio X and, if the mixing ratio is changed, the changed mixing ratio are output onto a printing paper sheet by the personal computer of the part ordering agent 56 (S19).

All the regenerated-ABS-using component parts and the virgin ABS component parts ordered by the part ordering agent 56 are supplied to the product manufacturer 10 to be used for production of the copying machine. Therefore, the amount of the recovered ABS used in the copying machine in the planned production period is determined at the point in time at which the order ratio X is determined. The use amount, i.e., the order ratio X, is thus determined. When, upon determination of this value, regenerated-ABS-using component parts and virgin ABS component parts are ordered, the part producer 53 is obliged to produce not only virgin ABS component parts but also regenerated-ABS-using component parts. The amount of recovered ABS to be used for production of the copying machine is efficiently used while being limited within the range of the amount of recovery of used component parts. Therefore, production of the regenerated ABS can be continued while avoiding failure to supply the necessary amounts of ABS component parts (regenerated-ABS-using component parts and virgin ABS component parts). Further, since the amount of virgin ABS components corresponding to the shortage of the supply in the case of using only regenerated-ABS-using component parts is supplied, it is possible to avoid occurrence of a state in which a large amount of virgin-ABS component parts are stocked by considering the possibility of shortage of the supply of regenerated-ABS-using component parts to cause a bad stock.

Consequently, "PCMR" can be smoothly performed while reducing the amount of recovered material disposed of outside the "PCMR" loop.

In the third embodiment, as described in S17 and S18, when the order ratio X is lower than the lower limit value, the above-described mixing ratio is changed to a lower value to set the order ratio X to a value equal to or lager than the lower limit value. This embodiment enables "PCMR" to be smoothly performed while avoiding any considerable reduction in productivity due to production of an extremely small amount of ABS-using components in the part producer 53.

The above-described allocated regenerated ABS amount can be computed on the basis of the recovered ABS production amount information and the information on the amount of recovery of used components in place of the regenerated ABS production amount information, as in the case of the above-described example of modification. While the example of part ordering by the part ordering agent 56 is described, the product manufacturer 10 itself may give an order from the part producer 53 for component parts.

In the "PCMR" and the information processing apparatus according to the above-described first embodiment, the amount of recovered ABS used in the copying machine in the product production process is determined on the basis of the amount of production of recovered ABS in the recovered ABS production process in place of the amount of recovery of used component parts. This arrangement ensures that the allocated recovered ABS amount can be obtained with improved accuracy to reliably limit shortage of regenerated ABS in comparison with a case where the above-described use amount is determined on the basis of the recovery amount without considering a loss of the material which may be caused in the recovered ABS production process.

In the "PCMR" according to the above-described first embodiment, the product producing method according to the above-described second embodiment, the mixture ratio determination method according to the second embodiment, or the information processing apparatus used for these methods, the mixing ratio of virgin ABS and recovered ABS is determined on the basis of the above-described recovery amount or the amount of production of recovered ABS to determine the amount of recovered ABS used in the copying machine in the product production process. In this arrangement, the mixing ratio of virgin ABS and recovered ABS in regenerated ABS produced by the regenerated material producer is determined to control the flow of recovered ABS in the "PCMR" loop.

In the "PCMR" according to the above-described example of modification, the part ordering method according to the above-described third embodiment, or the information processing apparatus used for these methods, the amount of recovered ABS used in the copying machine in the product production process is determined on the basis of the amount of production of regenerated ABS in place of the above-described recovery amount. This arrangement ensures that the allocated recovered ABS amount can be obtained with improved accuracy to reliably limit shortage of regenerated-ABS-using component parts in comparison with a case where the above-described use amount is determined on the basis of the recovery amount without considering a loss of the material which may be caused in the recovered ABS production process, and on the basis of the recovered ABS production amount without considering a loss of recovered ABS which may be caused in the regenerated material production process.

Also, the use ratio (or order ratio) of virgin-material component parts including no recovered ABS as a material and regenerated-ABS-using component parts in which regenerated ABS is used is determined to determine the amount of recovered ABS used in the copying machine in the product production process. In this arrangement, the above-described use ratio (or order ratio) is determined to control the flow of recovered ABS in the "PCMR" loop.

In the "PCMR" according to the above-described first embodiment, each of the recovered material or recovered ABS, the virgin material or virgin ABS and the regenerated material or regenerated ABS is a plastic material. This arrangement ensures that "PCMR" for recycling plastics can be realized in the loop of the "CMR".

In the personal computer provided as the information processing apparatus according to the above-described second embodiment, the main unit 30 provided as computation means is arranged to perform computational processing so that the proportion of recovered ABS in the mixing ratio of virgin ABS and regenerated ABS is limited to a value not larger than a predetermined upper limit value. In this arrangement, the proportion of recovered ABS in regenerated ABS is limited to a value not larger than a predetermined upper limit value to avoid occurrence of an event in which the physical properties of regenerated ABS are largely changed by mixing virgin ABS with a large amount of recovered ABS, and to thereby limit the physical properties of regenerated ABS within tolerable ranges.

Also, the main unit 30 provided as computation means is arranged to perform computational processing so that when the proportion of recovered ABS in the above-described mixing ratio R is lower than a lower limit value, the proportion is uniformly reduced to 0[%]. In this arrangement, when the mixing ratio R is reduced to 0[%] when the mixing ratio R is lower than the predetermined lower limit value to avoid occurrence of a reduction in productivity of the regenerated ABS due to mixing of an extremely small amount of recovered ABS in virgin ABS.

The personal computer provided as the information processing apparatus according to the above-described third embodiment is arranged to perform computational processing so that, when the proportion of recovered ABS in the above-described order ratio X, i.e., the use ratio of virgin ABS component parts and regenerated-ABS-using component parts in the product production process, is lower than a predetermined lower limit value, the mixing ratio of the recovered material to the virgin material in regenerated-ABS-using component parts is changed to a lower value and the above-described ratio is again obtained, and the use ratio again obtained and the changed mixing ratio value are output through the display 34 or the printer 35 provided as information output means. This arrangement enables "PCMR" to be smoothly performed while avoiding occurrence of any considerable reduction in productivity due to production of an extremely small amount of ABS-using components in the part producer 53.

The information processing apparatus according to the above-described first embodiment uses as information processing means the modem 33 that functions as communication means for outputting information to a communication circuit. This arrangement enables a plurality of personal computers provided in remote places to perform information communication and to compute a suitable amount of recovered ABS used in the copying machine.

Since the general-purpose Internet circuit is used as the communication circuit, the communication cost can be reduced in comparison with the case of using a private circuit provided only for the purpose of determining the use amount.

The present invention has the advantage of smoothly performing CMR while reducing the amount of a recovered material disposed of outside the CMR loop.

Various modifications will become possible for those skilled in the art after receiving the teachings of the present disclosure without departing from the scope thereof.

What is claimed is:

1. A recycling method in which a recovered material is reused for a new product, said method comprising:
    a product producing step of producing a product by assembling component parts;
    a recovery step of recovering a used component part as the recovered material from consumers;
    a recovered material producing step of producing the recovered material from the used component part;
    a regenerated material producing step of producing a regenerated material by mixing the recovered material with a virgin material not containing the recovered material; and
    a part producing step of producing a component part using the regenerated material,
    wherein the amount of use of the recovered material in the product in said product producing step is determined on the basis of a plan to produce the product and the amount of recovery of the used component part in said recovery step.

2. The method as claimed in claim 1, wherein the amount of use is determined, in addition to or in replace of the amount of recovery, on the basis of the amount of production of the recovered material in said recovered material producing step.

3. The method as claimed in claim 1, wherein the amount of use is determined by determining the mixing ratio of the virgin material and the recovered material in said regenerated material producing step.

4. The method as claimed in claim 1, wherein the amount of use is determined, in addition to or in replace of the amount of recovery, on the basis of the amount of production of the regenerated material in said regenerated material producing step.

5. The method as claimed in claim 1, wherein the amount of use is determined by determining the use ratio of a virgin-material component part in which only the virgin material is used as a material and a regenerated-material-using component part in which the regenerated material is used.

6. The method as claimed in claim 1, wherein each of the recovered material, the virgin material and the regenerated material comprises a plastic material.

7. A product producing method in which a regenerated-material-using component part using a regenerated material obtained by mixing a recovered material produced from a used component part recovered from consumers and a virgin material not containing the recovered material is assembled on the basis of a production plan to produce a product, said method comprising determining the amount of use of the recovered material in the product on the basis of at least one of the amount of recovery of the used component part from the consumers, the amount of production of the recovered material and the amount of production of the regenerated material, and on the basis of the production plan.

8. A part ordering method of ordering a regenerated-material-using component part using a regenerated material obtained by mixing a recovered material produced from a used component part recovered from consumers and a virgin material not containing the recovered material, said method comprising determining the order ratio of the regenerated-material-using component part and a virgin component part not including the regenerated material on the basis of at least one of the amount of recovery of the used component part from the consumers, the amount of production of the recovered material and the amount of production of the regenerated material, and on the basis of a plan to produce a product on which the regenerated-material-using component part is mounted.

9. A mixing ratio determination method of determining the mixing ratio of a recovered material produced from a used component part recovered from consumers and a virgin material not containing the recovered material with respect to a regenerated material obtained by mixing the recovered material and the virgin material, said method comprising determining the mixing ratio on the basis of at least one of the amount of recovery of the used component part from the consumers and the amount of production of the recovered material and on the basis of a plan to produce a product on which a component part using the regenerated material is mounted.

10. An information processing apparatus comprising:
    information input means of accepting input of information;

computation means of performing predetermined computational processing on the basis of the input information; and information output means of outputting the results of computation performed by said computation means, wherein said computation means is arranged to perform computational processing for computing the amount of use of a recovered material produced from a used component part recovered from consumers in a product on which a regenerated-material-using component part using a regenerated material obtained by mixing the recovered material and a virgin material not containing the recovered material, said computation means computing the amount of use on the basis of information on a plan to produce the product and information on the amount of recovery of the used component part from consumers.

11. The apparatus as claimed in claim 10, wherein said computation means is arranged to perform computational processing for computing the amount of use, in addition to or in replace of the information on the amount of recovery, on the basis of information on the amount of production of the recovered material.

12. The apparatus as claimed in claim 10, wherein said computation means is arranged to perform computational processing for computing the mixing ratio of the virgin material and the recovered material with respect to the regenerated material on the basis of the amount of use.

13. The apparatus as claimed in claim 12, wherein said computation means is arranged to perform computational processing for limiting the proportion of the recovered material in the mixing ratio to a value not larger than a predetermined upper limit value.

14. The apparatus as claimed in claim 12, wherein said computation means is arranged to perform computational processing for uniformly reducing the proportion of the recovered material in the mixing ratio to 0 [%] when the proportion is lower than a predetermined lower limit value.

15. The apparatus as claimed in claim 10, wherein said computation means is arranged to perform computational processing for computing the amount of use, in addition to or in replace of the information on the amount of recovery, on the basis of information on the amount of production of the regenerated material.

16. The apparatus as claimed in claim 10, wherein said computation means is arranged to perform computational processing for computing, on the basis of the amount of use, with respect to the product, the use ratio of a virgin-material component part in which only the virgin material is used as a material and a regenerated-material-using component part in which the regenerated material is used.

17. The apparatus as claimed in claim 16, wherein said computation means is arranged to perform computational processing for changing the mixing ratio of the recovered material to the virgin material in the generated-material-using component part to a lower value and again obtaining the use ratio when the proportion of the recovered material in the use ratio is lower than a predetermined lower limit, and for making said information output means output the obtained use ratio and the changed mixing ratio value.

18. The apparatus as claimed in claim 10, wherein said information output means comprises communication means of outputting information to a communication circuit.

19. The apparatus as claimed in claim 18, wherein said communication circuit comprises an Internet circuit.

20. A machine-readable program used for an information processing apparatus which performs predetermined computational processing, said program enabling a computer to function as use amount computation means of computing the amount of use of a recovered material obtained by disassembly of a used component part recovered from consumers in a product on which a regenerated-material-using component part using a regenerated material obtained by mixing the recovered material with a virgin material not containing the recovered material, the computation means computing the amount of use on the basis of at least one of information on the amount of recovery of the used component part, information on the amount of production of the recovered material and information on the amount of production of the regenerated material, and on the basis of information on a plan to produce the product.

* * * * *